(12) United States Patent
Stanley

(10) Patent No.: US 6,203,233 B1
(45) Date of Patent: Mar. 20, 2001

(54) EXPANSION JOINT FOR THERMOPLASTIC RAIL SYSTEMS

(75) Inventor: Larry S. Stanley, Pine Beach, NJ (US)

(73) Assignee: Avcon Technologies, LLC, Toms River, NJ (US)

( * ) Notice: Subject to any disclaimer, the term of this patent is extended or adjusted under 35 U.S.C. 154(b) by 0 days.

(21) Appl. No.: 09/307,447

(22) Filed: May 10, 1999

(51) Int. Cl.[7] ............................................. F16B 7/18
(52) U.S. Cl. ........................ 403/28; 403/260; 256/65
(58) Field of Search .................. 256/59, 65, 66, 256/68, 69, 19, 1; 403/28, 206, 208, 210

(56) References Cited

U.S. PATENT DOCUMENTS

| | | | |
|---|---|---|---|
| 1,840,048 | * 1/1932 | Michelman | 256/65 X |
| 2,242,427 | * 5/1941 | Heanue | 256/65 |
| 2,930,638 | * 3/1960 | Morrissey | 256/65 X |
| 2,999,671 | * 9/1961 | Blayden | 256/65 |
| 4,150,907 | * 4/1979 | Thurnauer | 256/67 X |
| 5,303,900 | * 4/1994 | Zulick, III et al. | 256/65 |
| 5,370,368 | * 12/1994 | Terrels et al. | 256/19 |
| 5,437,433 | * 8/1995 | Rezek | 256/67 |
| 5,547,169 | * 8/1996 | Russell | 256/67 |
| 5,566,926 | * 10/1996 | Voigt | 256/65 X |
| 5,785,447 | * 7/1998 | Fonti et al. | 256/65 X |

* cited by examiner

Primary Examiner—Harry C. Kim
(74) Attorney, Agent, or Firm—Clifford G. Frayne

(57) ABSTRACT

An expansion joint for connection of intersecting members of a plastic railing system, the expansion joint having a tubular collar having a male structural member positioned therein and secured to one intersecting tubular member, the second intersecting tubular member slidably receivable within the tubular collar and about the male structural member, the tubular collar having one end having a coped surface for cooperable mating with the exterior surface of the first intersecting tubular member so as to provide a structurally secure connection between the intersecting tubular members yet allow for the thermal expansion and contraction of one intersecting tubular member.

4 Claims, 6 Drawing Sheets

US 6,203,233 B1

EXPANSION JOINT FOR THERMOPLASTIC RAIL SYSTEMS

BACKGROUND OF THE INVENTION

1. Field of the Invention

The present invention relates to thermoplastic rail systems, and more particularly to an expansion joint for use with such thermoplastic rail systems.

2. Description of the Prior Art

Railings serve the purpose of guard rails, hand rails, grab rails and in many instances serve as area dividers. Railings have long been used for a variety of applications, such as multi-story buildings with stairways, balconies, patios, industrial buildings, playgrounds and schools, among any number of other wide variety of uses. These uses are both indoors and outdoors. Outdoor railing systems are exposed to the weather and other corrosive elements such as salt water, chemical vapors and the like. In addition, outdoor railings are subjected to temperature differentials and in some instances depending upon the location, extreme temperature differentials.

Building codes require the use of high strength material such as iron, steel, aluminum and the like to provide the sufficient rigidity and strength to insure adequate safety and security qualities depending upon the location and purpose of the railing system. Thermoplastic railing systems have become popular due to certain intrinsic qualities of the thermoplastic as set forth hereinafter. In order to meet building codes, thermoplastic railing systems typically include a plurality of vertical posts which are mounted or secured to a base or decking member. These vertical posts typically have a tubular steel reinforcing member which is positioned within a tubular thermoplastic pipe formed from materials such as acrylonitrile styrene acrylate (ASA), PVC, acrylic or the like, in order to meet the necessary rigidity and strength requirements.

These vertical posts interconnect with one or more horizontal rails which in turn may have vertical balusters extending therebetween. Usually at least one of the horizontal rails and in most instances, the top most rail of the railing system also includes a tubular steel insert within the thermoplastic tubular member, this tubular steel insert being aligned and secured to vertical posts having a tubular steel reinforcing member. The tubular steel insert in the rail may or may not run continuously throughout. The intermediate vertical balusters and horizontal rails which do not have structural metal inserts are commonly referred to in the trade as in-fill area posts and rails.

While thermoplastic rail systems solve many of the problems experienced by metal railings due to weather and corrosive elements, one of the problems with thermoplastic rail systems which has not been adequately solved is the manner in which it accommodates thermal expansion and contraction of the horizontal rails or balusters. Thermal expansion and contraction solutions in the past, while meeting the strength and rigidity requirements, have failed in the aesthetic requirements in that thermal contraction resulted in a visible gap between the mating members of the horizontal rails and vertical posts or horizontal rails and balusters.

The present invention provides for an expansion joint which meets or exceeds the strength and rigidity requirements and solves the aesthetic problems experienced by thermal expansion and contraction.

OBJECTS OF THE INVENTION

An object of the present invention is to provide for an improved thermoplastic rail system providing an aesthetically pleasing appearance while maintaining the requisite strength and rigidity required by building codes.

Another object of the present invention is to provide an improved thermoplastic rail system which adapts to thermal expansion and thermal contraction without affecting the strength and rigidity required by building codes.

A still further object of the present invention is to provide for an improved thermoplastic rail system having thermal expansion and thermal contraction joints which are resistant to moisture migration.

A still further object of the present invention is to provide for an improved expansion joint for thermoplastic rail systems.

A still further object of the present invention is to provide for an improved expansion joint for thermoplastic rail systems which is aesthetically pleasing and shields such thermal expansion or contraction from visibility.

SUMMARY OF THE INVENTION

A thermoplastic rail system having expansion joints for the accommodation of thermal contraction and thermal expansion which meet the requisite strength and rigidity requirements of building codes and are aesthetically pleasing in that they shield such thermal expansion or thermal contraction from visibility.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
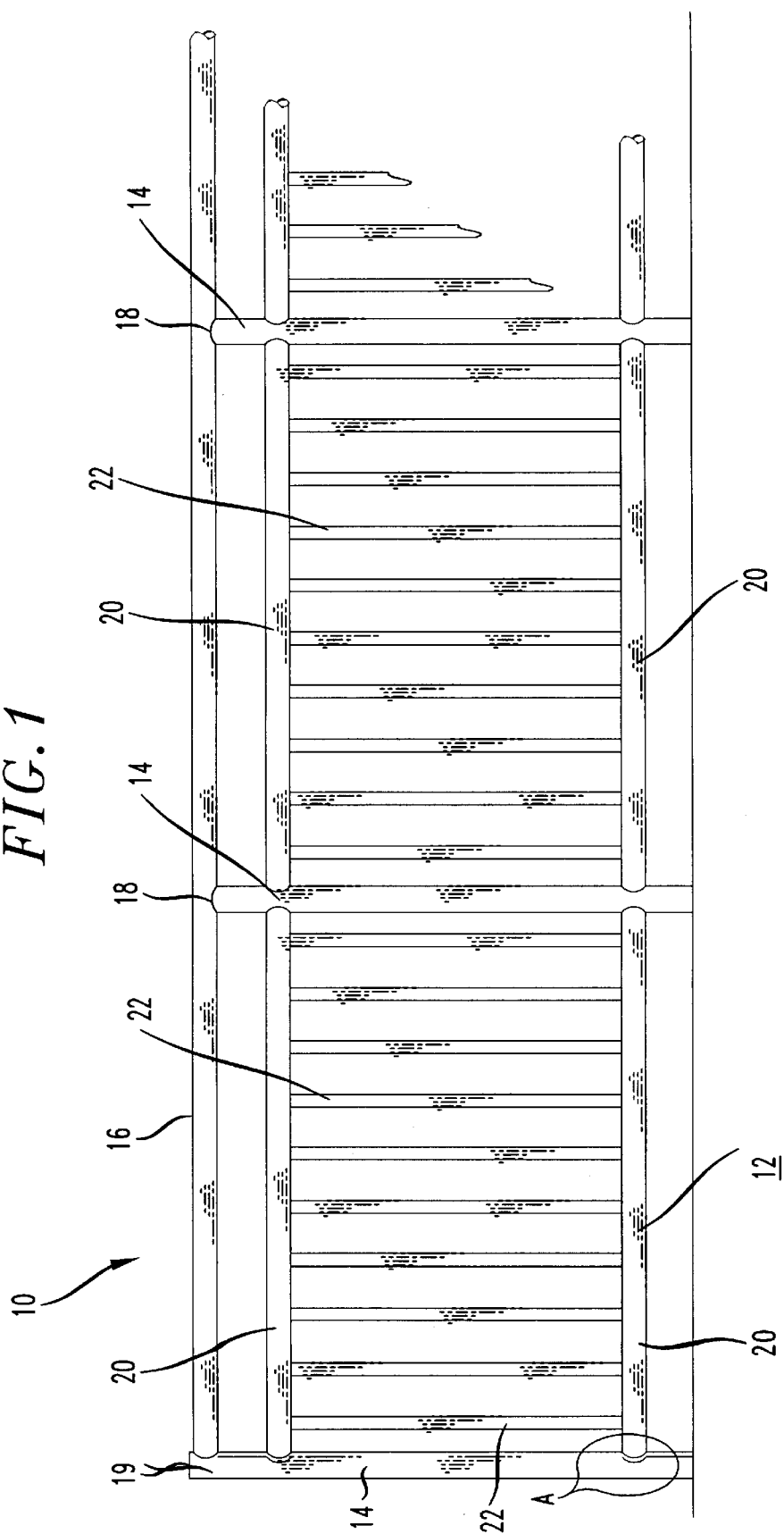
FIG. 1 is a front elevational view of a typical reinforced plastic hand rail security system.

FIG. 1 illustrates a thermoplastic rail system 10 to which the present invention has application. The rail system 10 is installed on a support surface 12 which can be a wood or concrete deck or any other home, commercial or industrial site where railings are used. Only two particular railing sections are shown in FIG. 1, it being appreciated that any number of sections can be joined together in a repeated fashion, depending upon the size of the area where the rail system is to be installed and the length of the railing system desired.

The rail units and the posts are made of tubular thermoplastic pipe. It is contemplated that the pipe/tubing may be suitably reinforced with fibers and the like in accordance with well known state of the art techniques wherein additional strength and/or rigidity is required. Further, the pipes may have a smooth, gloss, satin or matte finish and may be made in a variety of colors by adding pigment to the extrusion material.

Typically, the size of thermoplastic pipe found suitable for the present invention would have an outside diameter of approximately two inches and have a wall thickness of at least one quarter of an inch, although smaller and larger size tubing may be used with the present invention. In addition, while the rail system disclosed as well as the invention herein are illustrated with tubular pipe having a circular cross section, the tubular pipe may also have one of many other geometric cross sections (i.e. square, triangular, hexagon, etc.).

The thermoplastic material is impervious to corrosive elements such as salt, spray, rain, snow, as well as corrosive chemical atmospheres. Further, the pipe is resistant to denting, scratching and other physical abuse.

The thermoplastic rail system comprises load bearing posts 14 which are mounted to or in the support surface 12. A railing member 16 normally spans the railing system 10 proximate the upper terminus 18 of load bearing posts 14 and a plurality of rails 20 and balusters 22 are code required so as to prevent bodily ingress or egress through the thermoplastic rail.

In order to provide extra security and rigidity, particularly when the railing system 10 is used on elevated balconies or elevated walkways or elevated patios or decks, the load bearing posts 14 and upper rail member 16 each have structural metal inserts for additional rigidity and reinforcement, these inserts being mechanically secured at the intersection of the upper rail 16 and the load bearing posts 14. Load bearing post 14 would normally have a tubular metal member inserted throughout its entire length. Rail member 16 will have a tubular metal insert at least at the intersection with a vertical post.

The problem which has been encountered and the problem which applicant has solved is the thermal expansion and contraction of the rails where they meet or mate with posts 14 and also the balusters extending between rails. The thermoplastic rail system must accommodate thermal expansion and contraction with respect to these rails and balusters without compromising the strength and safety of the railing system or detracting from the aesthetic appearance.

Figure 2:
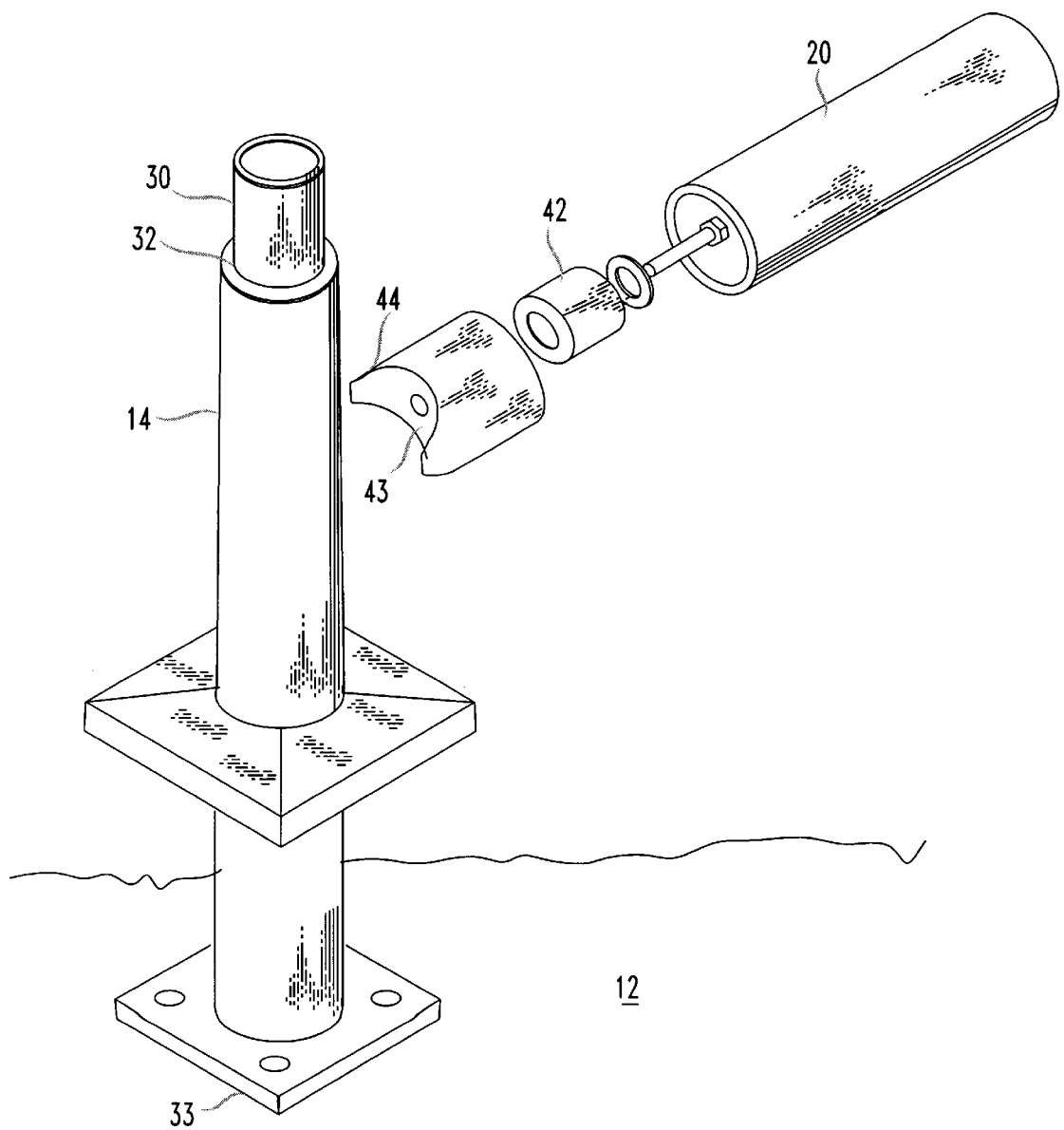
FIG. 2 is a perspective of the expansion joint.

FIG. 2 is a partial exploded perspective view of area A of FIG. 1 which illustrates applicant's expansion joint to accommodate thermal expansion and contraction. A vertical load bearing thermoplastic post 14 of tubular construction has a structural metal insert 30 positioned within tubular throughbore 32. This vertical load bearing post member 14 would be secured to support surface 12 by any suitable means and may be maintained in position by a flange plate assembly 33 which may or may not have a decorative cover member 34 also constructed of a similar thermoplastic.

Rail 20 is mated at one end to vertical load bearing post 14 and to a similar vertical load bearing post 14 (not shown) at its opposite end or other vertical support structure. Rail 20 is constructed of thermoplastic and is of a tubular configuration. In order to mate rail 20 with vertical load bearing post 14, an expansion collar 40 and internally mounted male structural member 42 are utilized. The invention is illustrated with respect to thermoplastic tubular members of circular cross section but has equal application to tubular member of varying shaped cross sections as well as both the post and rails have the same cross section.

As will be more fully described hereafter, expansion collar 40 is tubular in cross section having a first end 44 which is coped 43 to a configuration that matches the outer surface of vertical post 14. The second end 46 of expansion collar 40 is open in cross section having an inner diameter cross section or configuration equal to the outer diameter or cross section or configuration of rail 20 and is for the receipt of male structural member 42.

Figure 3:
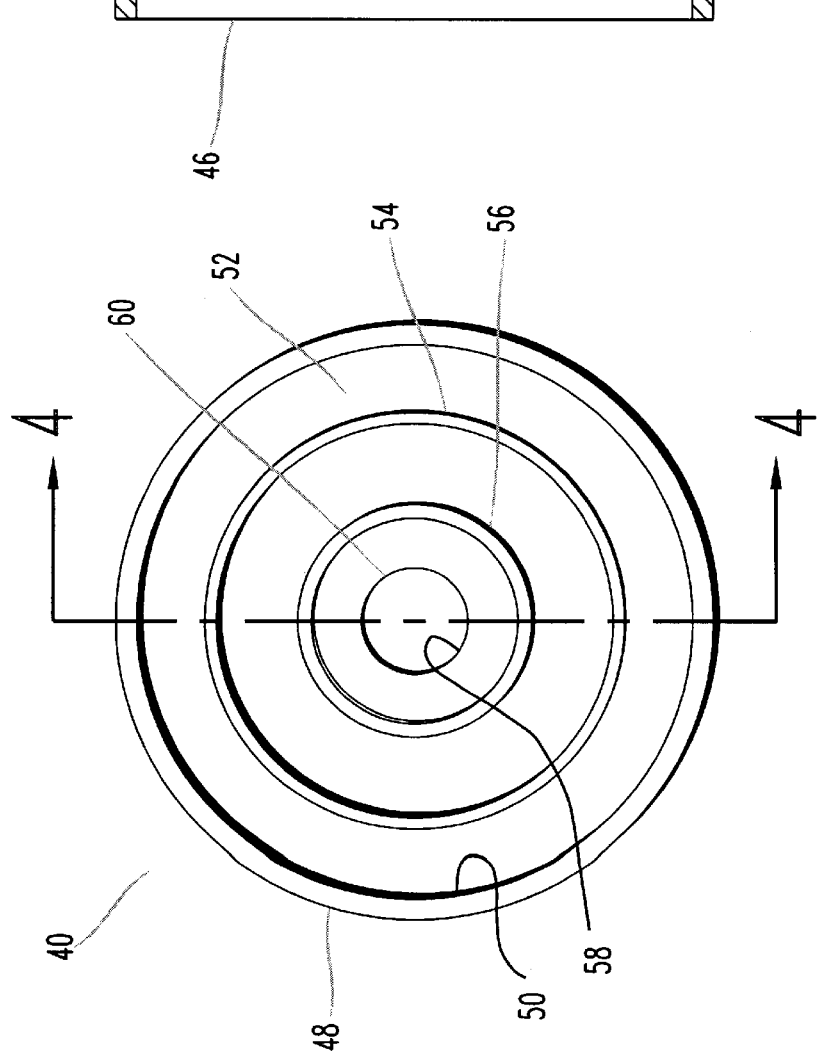
FIG. 3 is an end view of the expansion collar.

FIG. 3 is a view of the interior of expansion collar 40 from second end 46. Expansion collar 40 is defined by an outer wall 48, having an inner surface 50 the diameter of which is equal to the outer circumference of rail 20 or the outer geometric configuration of rail 20. Depending upwardly from the arcuate inner surface 52 of coped first end 44 is a first annular rib 54 concentric with outer wall 48. Within first annular rib 54 and in spaced apart relationship is a second upstanding annular rib 56 concentric with first annular rib 54 and outer wall 48. Centered within second annular rib 56 is an aperture 58 extending through coped end wall 44, aperture 58 being for receipt therethrough of a threaded mechanical fastener. The annular surface 60 between second annular rib 56 and the perimeter of aperture 58 is planar as further illustrated in FIG. 4 which is a cross section of expansion collar 40 along plane 4—4 of FIG. 3.

Figure 4:
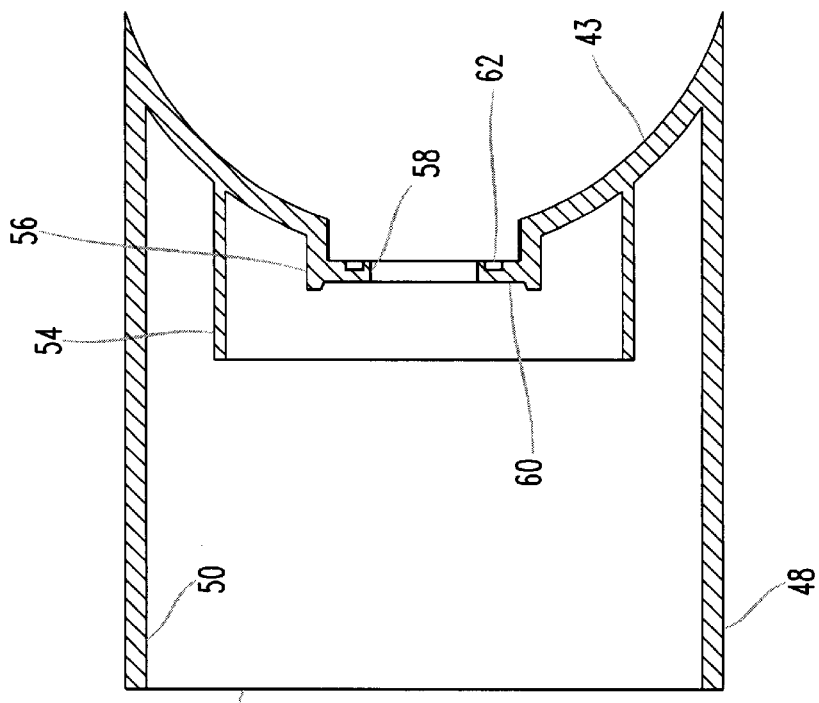
FIG. 4 is a cross section view along plane 4—4 of FIG. 3.

FIG. 4 illustrates a cross section of expansion collar 40 and the relationship between first end 44 and coped surface 43 and arcuate inner surface 52 along Plane 4—4 of FIG. 3. FIG. 4 also illustrates first annular rib 54 and its height relationship with respect to second annular rib 56. Also illustrated in greater detail is the planar annular surface 60 about aperture 58. Aperture 58 is for the receipt of a mechanical fastening means as which will be more fully discussed hereafter which would extend through aperture 58 and be secured to vertical post 14 and tubular metal insert 30. FIG. 4 illustrates the fact that on coped surface 43 of expansion collar 40, there is an annular recess about aperture 58 defining an annular surface 62. In the assembly stage, annular surface 62 is for the receipt of a resilient O-ring (not shown) so as to prevent the ingress of any moisture into vertical post 14 in order to protect steel insert 30.

Figure 5:
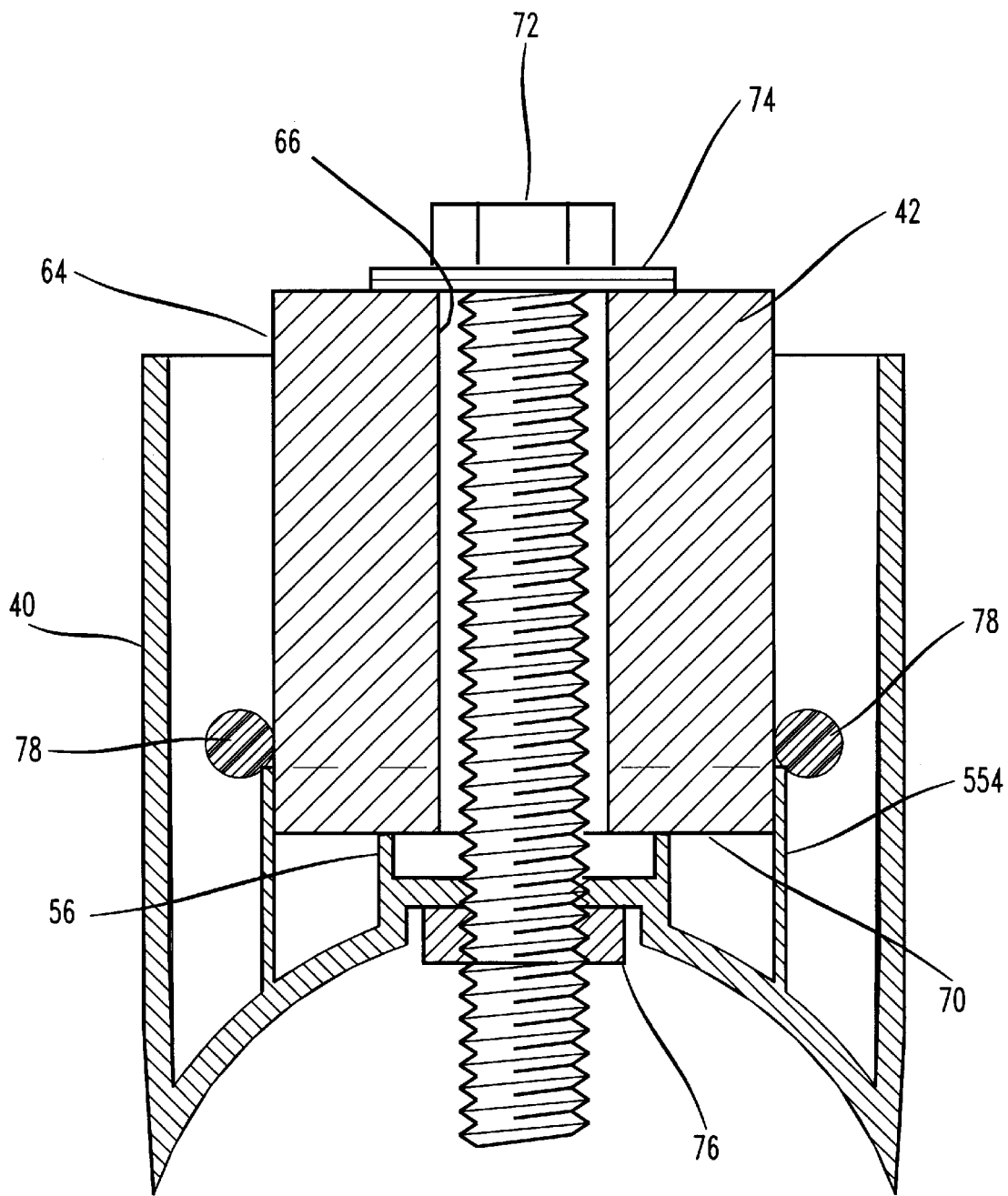
FIG. 5 is the cross section view of FIG. 4 including an engagement means.

Referring now to FIG. 5 there is illustrated a cross sectional view of expansion collar 40 with male structural member 42 and the mechanical fastener installed therein. Male structural member 42 is cylindrical in shape having an outer surface 64, the circumference of which is substantially identical to the inner circumference of first annular rib 54 such that male structural member 64 is frictionally engaged with the inner surface of first annular rib member 54 when male structural plug member 64 is inserted into expansion collar 40. Male structural member 42 also has a centrally disposed throughbore 66 which is aligned with aperture 58 when male structural member 42 is so frictionally engaged with annular rib member 54. The depth of insertion of male structural member 42 into expansion collar 40 is limited by second annular rib member 56 and the upper annular surface 68 thereof engaging first end 70 of male structural member 42 about throughbore 66.

In the embodiment a threaded mechanical fastener 72 with washer 74 is inserted through throughbore 66 and aperture 58 and would extend into the area defined by first end 44 and its coped surface 43. FIG. 5 also illustrates the placement of O-ring 76 on annular surface 62 such that it circumscribes the mechanical fastener 72. Additionally, a second resilient O-ring 78 is positioned on and circumscribes the male structural plug member 42 is positioned adjacent the upper annular surface of first upstanding annular rib 54.

Figure 6:
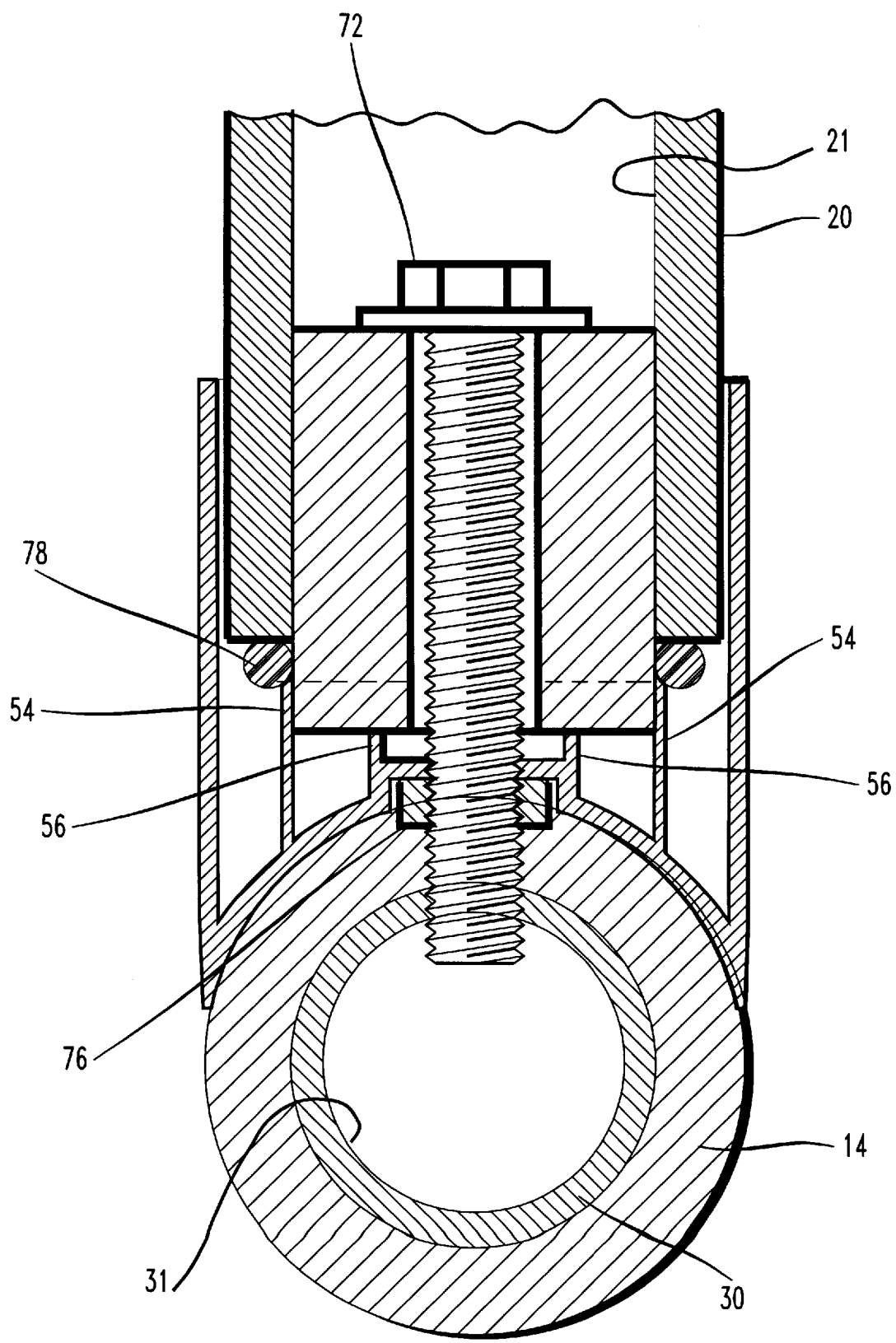
FIG. 6 is the cross section view of FIG. 5 including the rail member.

FIG. 6 is a cross sectional view along Plane 6—6 of FIG. 1 illustrating the cooperation of expansion collar 40 with rail 20, male structural member 42 and load bearing post 14. The coped surface 43 of first end 44 of expansion collar 40 is mated to the outer surface of load bearing post 14 which has a tubular metal insert member 30 disposed therein. Load bearing post 14 and metal insert member 30 define a throughbore 31 and load bearing post 14 and metal insert member 30 are fabricated with a horizontal throughbore 33 which extends from the outer circumference of load bearing post 14 to communication with throughbore 31. Throughbore 33 is threaded so as to cooperate with threaded mechanical fastener means 72. In this construction, it can be seen that expansion collar 40 is mated to load bearing post 14 by means of threaded mechanical fastener 72 and male structural member 60. In threading mechanical fastener 72 through threaded throughbore 33 in load bearing post 14 and metal insert 30 such that surface 44 is juxtaposed on the outer surface of load bearing post 14, O-ring 76 forms a water tight seal about mechanical fastener 72 and annular surface 62.

Rail 20 has a circumferential outer surface or cross section 80 equal to the inner circumferential surface or cross section 50 of expansion collar 40. Rail 20 defines a throughbore 21 having a circumferential cross section equal to the outer circumference 64 of male structural member 20. Rail 20 is inserted into expansion collar 40 until its circumferential end surface 82 engages O-ring 78 about the upper surface of first annular rib member 54. The outer circumferential side wall 80 and the inner circumferential wall 21 are therefore in frictionally engaged contact with the inner surface 50 of outer wall 48 of expansion collar 40 and the outer circumference 64 of male structural member 42 respectively.

The extension of male structural member 42 into throughbore 21 of rail 20 provides the necessary structural rigidity for rail 20 as required by code. A similar installation would occur at the opposite end of rail 20 in conjunction with a second load bearing post 14 utilizing the identical expansion collar 40, male structural member 42 and installation procedure. Similar procedures would be repeated depending upon the number of rails extending between vertical load bearing posts 14.

In this configuration, under thermal expansion, the rail 20 is free to expand against O-ring 78 which can deform to allow for such expansion. Further, under this installation procedure, rail 20 is free to thermally contract, but such contraction still maintains the end of rail 20 within the expansion collar 40 such that an individual observing the rail system would not notice any aesthetically displeasing separation as a result of thermal contraction. Still further, male structural member 42 extends a sufficient distance into the throughbore 21 of rail 20 such that the safety and rigidity of the railing system is not compromised by such thermal contraction.

The structural integrity of the railing system is maintained by the vertical posts having the metal or steel tubular liner and the elongate top rail which has a metal insert where it is affixed to the vertical posts. The intermediate rails and balusters require structural integrity, particularly if the railing system is positioned on an elevated surface such as a balcony. The rigidity for the elongate intermediate rails is provided by the male structural member 42 being securely fastened to the vertical post and extending into the throughbore 21 of the rail 20. In the configuration disclosed thus far, the male structural member 42 and collar 40 are both secured to vertical post 14 by the same fastening means 72.

Figure 7:
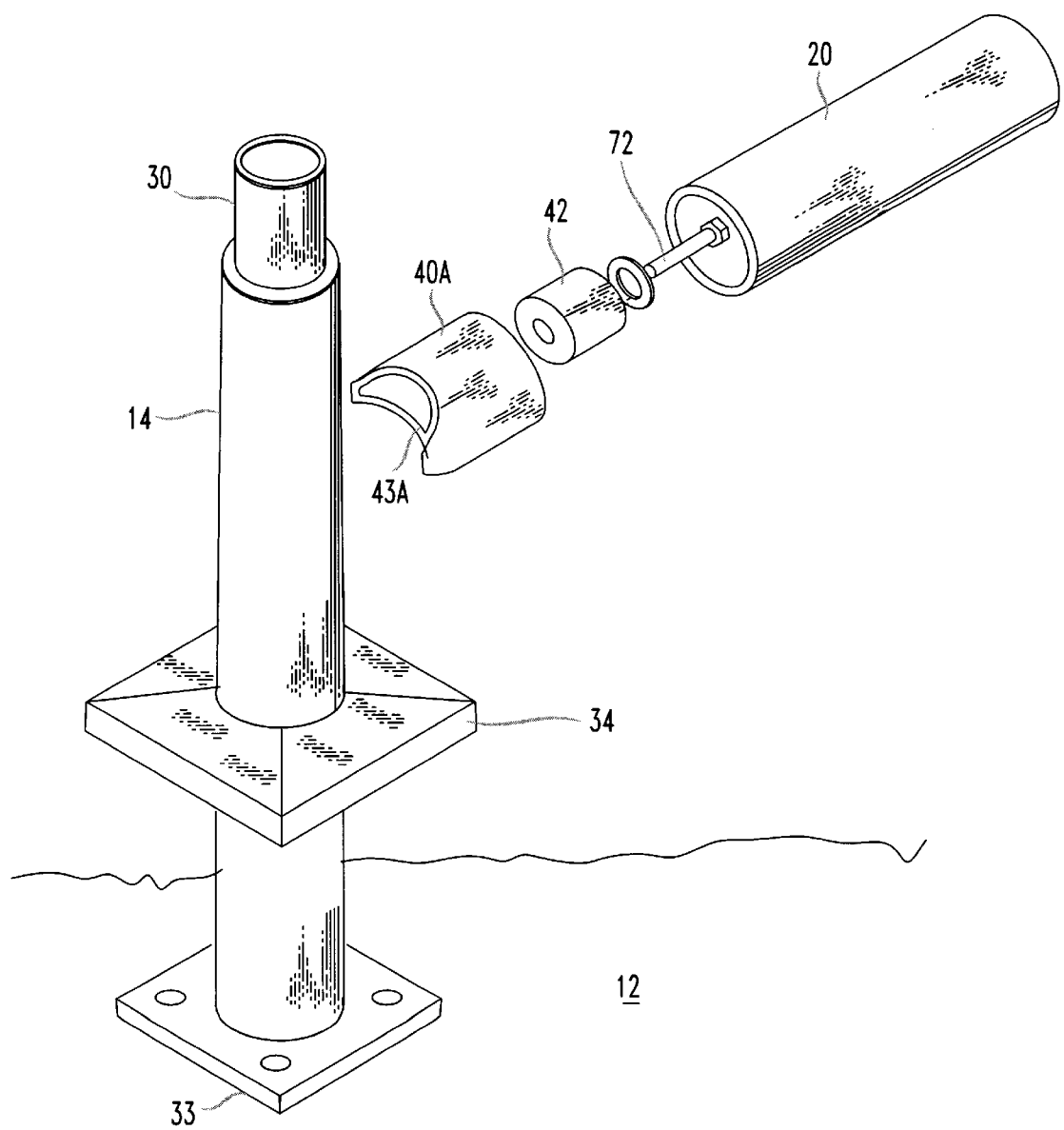
FIG. 7 is a perspective view of an alternative embodiment of the expansion joint.

In an alternative embodiment illustrated in FIG. 7, male structural member 42 may be secured directly to the vertical post 20 utilizing fastening means 72. The throughbore 21 of rail 20 would then slide over male structural member 42 such that the end of rail 20 was proximate vertical post 14. A collar 40A having an interior diameter equal to the exterior diameter of rail 20 could be slipped over rail 20 and be secured to vertical post 14 and thus aesthetically cover the intersection of rail 20 with vertical post 14. In this embodiment, collar 40A is tubular in construction having a cross sectional configuration identical to rail 20. In this configuration, however, tubular collar 40A would not have a coped surface as disclosed in the first embodiment, but rather, would have a coped annular wall 43A which would be configured to match the exterior surface of vertical post 14.

In this configuration rail 20 is secured to a vertical post 14 in accordance with safety and code requirements and the gap between rail 20 and vertical post 14 is blocked or masked by tubular collar 40A which may be secured to vertical post 14 by means of an adhesive applied to the annular coped wall 43A. Both embodiments provide the structural integrity required for the railing system, but provide alternate methods of masking the intersection of rail system members yet allowing for thermal contraction and expansion.

While the present invention has been disclosed with respect to the exemplary embodiments thereof, it will be recognized by those of ordinary skill in the art that many modifications may be made without departing from the spirit and scope of the invention. Therefore it is manifestly intended that the invention be limited only by the scope of the claims and the equivalence thereof.

I claim:

1. An expansion joint for connection of intersecting members of a thermoplastic railing system comprising:
    a first intersecting tubular member having a throughbore;
    a second intersecting tubular member having a throughbore;
    a tubular collar having a first end and a second end, said first end having a coped surface cooperable for mating with the exterior surface of said first intersecting tubular member, said coped surface having a centrally disposed aperture therein, said second end of said tubular collar having an open cross sectional configuration for a frictional slidable receipt of one end of said second intersecting tubular member;
    a male structural member having a cross section complimentary with said throughbore of said second tubular member for slidable frictional engagement therein, said male structural member engaged within said tubular collar, said male structural member having a centrally disposed throughbore alignable with said aperture in said first end coped surface of said tubular collar wherein said tubular collar has an interior concentric wall with an inner circumference which is complimentary with an outer circumference configuration of said male structural member, said interior concentric wall for the frictional engagement and positioning of said male structural member within said tubular collar and alignment of said throughbore of said male structural member with said aperture in said coped surface of said tubular collar; and
    a fastening means extending through said throughbore of said male structural member and said aperture of said coped surface of said first end of said tubular collar and secured into said first tubular intersecting member.

2. The expansion joint in accordance with claim 1 wherein a recess is formed on said coped surface about said aperture in said coped surface for receipt of a water type O-ring gasket.

3. The expansion joint in accordance with claim 1 wherein a resilient O-ring gasket is disposed about said male structural member.

4. The expansion joint in accordance with claim 1 wherein said fastening means comprises a threaded fastener threadedly securable into said first intersecting tubular member.

\* \* \* \* \*